United States Patent
Higbie, Jr. et al.

(10) Patent No.: US 10,026,043 B2
(45) Date of Patent: Jul. 17, 2018

(54) BLEND PLAN OPTIMIZATION FOR CONCENTRATED CONSUMABLE PRODUCTS

(71) Applicant: The Coca-Cola Company, Atlanta, GA (US)

(72) Inventors: Jon Allen Higbie, Jr., Tyrone, GA (US); David Quinton Cross, Atlanta, GA (US); Douglas Alan Bippert, Marietta, GA (US); Sean Patrick Lennon, Atlanta, GA (US); Seon Ah Lee, Atlanta, GA (US); Timothy Allen Anglea, Windermere, FL (US)

(73) Assignee: The Coca-Cola Company, Atlanta, GA (US)

( * ) Notice: Subject to any disclaimer, the term of this patent is extended or adjusted under 35 U.S.C. 154(b) by 440 days.

(21) Appl. No.: 13/714,569

(22) Filed: Dec. 14, 2012

(65) Prior Publication Data
US 2014/0170273 A1 Jun. 19, 2014

(51) Int. Cl.
*G06Q 10/04* (2012.01)

(52) U.S. Cl.
CPC ................ *G06Q 10/043* (2013.01)

(58) Field of Classification Search
CPC .. G06Q 10/043; G06Q 10/00; G06Q 30/0206; G06F 17/50; B67D 1/0027; G05B 19/418; B01F 15/00253
USPC ........................................................ 700/266
See application file for complete search history.

(56) References Cited

U.S. PATENT DOCUMENTS

| | | | |
|---|---|---|---|
| 3,615,674 A | 10/1971 | Bass et al. | |
| 5,965,190 A | 10/1999 | Gallaher et al. | |
| 8,626,327 B2 * | 1/2014 | Bippert | G06Q 10/06 700/100 |
| 8,626,564 B2 * | 1/2014 | Bippert | G06Q 30/0202 705/7.31 |
| 2001/0053404 A1 * | 12/2001 | Powrie | A23L 2/02 426/599 |
| 2005/0158798 A1 | 7/2005 | Shar | |

(Continued)

FOREIGN PATENT DOCUMENTS

| | | |
|---|---|---|
| CN | 1998031 A | 7/2007 |
| CN | 102725703 A | 10/2012 |

(Continued)

*Primary Examiner* — Shogo Sasaki
(74) *Attorney, Agent, or Firm* — Dentons US LLP (57) ABSTRACT

A blending plan for concentrated consumable products, such as liquid food and beverage products, may be optimized by utilizing a computer device executing a software algorithm. The computing device receives one or more inputs associated with the blending of various components employed in producing quantities of a concentrated consumable product over a predetermined time interval. The computing device may be further utilized to apply constraints to each of the one or more inputs. The constraints may be utilized to enforce quality, raw material and component bounds, supply and demand requirements, product and component supply balance, capacity limitations and business rules in order to minimize costs and complexity associated with the production of a concentrated consumable product while maximizing quality, thereby optimizing the blending plan.

15 Claims, 6 Drawing Sheets

(56) References Cited

U.S. PATENT DOCUMENTS

| | | | | |
|---|---|---|---|---|
| 2009/0070234 | A1* | 3/2009 | Peters | B67D 1/0041 |
| | | | | 705/26.1 |
| 2010/0124592 | A1* | 5/2010 | Anderson | A23L 11/00 |
| | | | | 426/270 |
| 2011/0123688 | A1* | 5/2011 | Deo | B67D 1/0027 |
| | | | | 426/231 |
| 2012/0114813 | A1 | 5/2012 | Bippert et al. | |
| 2012/0114814 | A1 | 5/2012 | Bippert | |
| 2012/0116563 | A1 | 5/2012 | Bippert et al. | |
| 2012/0116565 | A1 | 5/2012 | Bippert et al. | |
| 2012/0116566 | A1 | 5/2012 | Bippert | |
| 2012/0116783 | A1 | 5/2012 | Bippert | |
| 2012/0116841 | A1 | 5/2012 | Bippert et al. | |
| 2012/0116842 | A1 | 5/2012 | Bippert et al. | |
| 2013/0273217 | A1* | 10/2013 | Minvielle | H05B 6/6447 |
| | | | | 426/231 |
| 2014/0172142 | A1* | 6/2014 | Higbie, Jr. | G06F 17/50 |
| | | | | 700/103 |

FOREIGN PATENT DOCUMENTS

| | | |
|---|---|---|
| WO | 2012/061553 A1 | 5/2012 |
| WO | 2012/061617 A1 | 5/2012 |
| WO | 2012/061626 A1 | 5/2012 |
| WO | 2012/096712 A1 | 7/2012 |

* cited by examiner

BLEND PLAN OPTIMIZATION FOR CONCENTRATED CONSUMABLE PRODUCTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many food and beverage products are produced from a concentrate. A concentrate is a form of substance which has had the majority of its intermediate product (which in the case of a liquid is a solvent) removed. Typically, a concentrate is produced by the removal of water from a solution or suspension, such as the removal of water from fruit juice. One benefit of producing a concentrate is that of a reduction in weight and volume for transportation as the concentrate can be re-constituted at the time of usage by the addition of the solvent.

Developing a production plan for food and beverage products made from a concentrate presents unique challenges for a business unit manager. For example, the input material for fruit-based beverages (i.e., fruit) can be highly variable in available quantity, cost, and quality. As a further example, the available quantity, cost, and quality of fruit can depend on hurricane activity or if an early freeze occurs. Thus, the supply of available fruit for beverages can be highly variable across multiple geographic regions. Consumer demand and price sensitivity are also important aspects to consider in concentrated food and beverage production. In particular, the volume of a food or beverage produced should be sufficient to meet consumer demand at a price consumers will bear. In the production of concentrated food and beverage products, meeting consumer demand includes the blending optimization of various components so as to deliver consistent taste, texture and/or other properties. For example, a concentrated orange juice beverage may be blended from a variety of different types of juices with the blend or composition determining the overall taste, texture and other properties of the resulting drink. Previous blending techniques do not necessarily allow the manufacturing process to be optimized in terms of utilizing raw materials to their fullest extent or in terms of maintaining a product having consistent component attribute profiles (e.g., taste, texture, shelf life and costs) despite variances in the supply of the components of the product. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for optimizing a blending plan for concentrated consumable products. One or more inputs associated with a blending plan for the production of a concentrated consumable product over a predetermined interval of time may be received by a computer. The computer may then be utilized to apply one or more constraints to each of the one or more inputs to optimize the blending plan for the concentrated consumable product over the predetermined interval of time. The one or more constraints may be utilized for minimizing costs and complexity associated with the production of a concentrated consumable product while maximizing quality.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for optimizing a blending plan for concentrated consumable products. One or more inputs associated with a blending plan for the production of a concentrated consumable product over a predetermined interval of time may be received by a computer. The computer may then be utilized to apply one or more constraints to each of the one or more inputs to optimize the blending plan for the concentrated consumable product over the predetermined interval of time. The one or more constraints may be utilized for minimizing costs and complexity associated with the production of a concentrated consumable product while maximizing quality.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
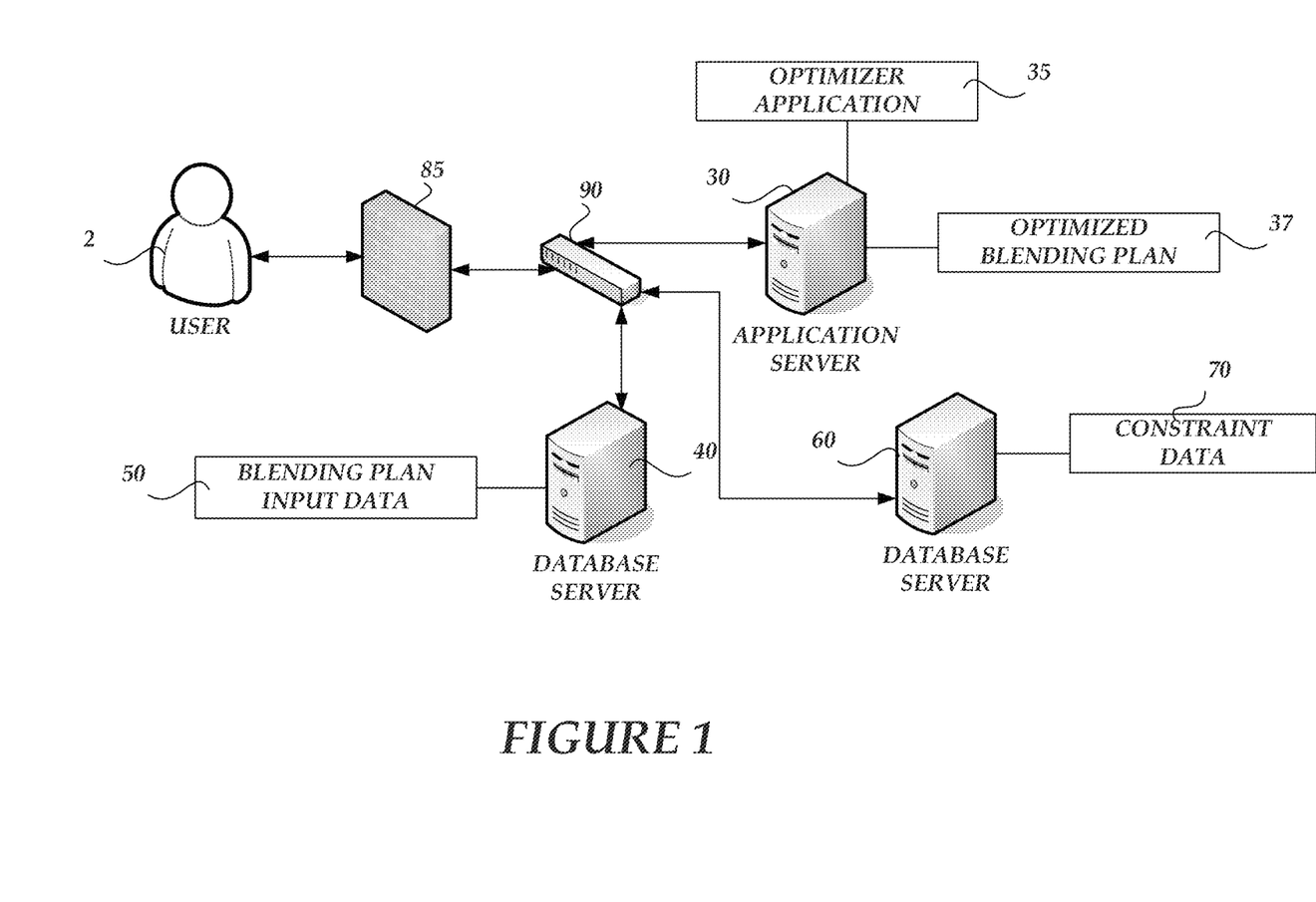
FIG. 1 is a block diagram illustrating a network architecture for optimizing a blending plan for concentrated consumable products, in accordance with various embodiments.

Referring now to the drawings, in which like numerals represent like elements through the several figures, various aspects of the present invention will be described. FIG. 1 is a block diagram illustrating a network architecture for optimizing a blending plan for concentrated consumable products, in accordance with various embodiments. The network architecture includes a user 2 in communication with an application server 30 and database servers 40 and 60, through firewall 85 and network switch 90. In accordance with an embodiment, the user 2 may comprise a user of a networked client computing device for executing optimizer application 35 which is hosted by the application server 30. As will be described in greater detail herein, the optimizer application 35 may be utilized for generating an optimized blending plan 37 for concentrated consumable products over a user-configurable interval of time (i.e., a blending plan period). In accordance with an embodiment, the optimizer application 35 may utilize blending plan inputs 50 (which may be stored on the database server 40) and apply constraint data 70 (which may be stored on the database server 60) to generate the optimized blending plan 37.

As defined herein, a concentrated consumable product includes a liquid food or beverage which is made from a concentrate. As is known to those skilled in the art, a concentrate is a form of substance which has had the majority of an intermediate product (e.g., a base component such as a solvent) removed. Typically this will be the removal of water from a solution or suspension such as the removal of water from fruit juice. One benefit of producing a concentrate is that of a reduction in weight and volume for transportation as the concentrate can be re-constituted at the time of usage by the addition of the solvent. Examples of concentrated consumable products consistent with the various embodiments described herein may include, but are not limited to, fruit juices (e.g., orange juice, apple juice, etc.), liquid dairy products (e.g., milk) and liquid food products (e.g., yogurt, soup, etc.). It should be understood that the optimizer application 35 may also be utilized to optimize blending plans for other types of concentrated consumable products without departing from the spirit and scope of the embodiments described herein.

Figure 2:
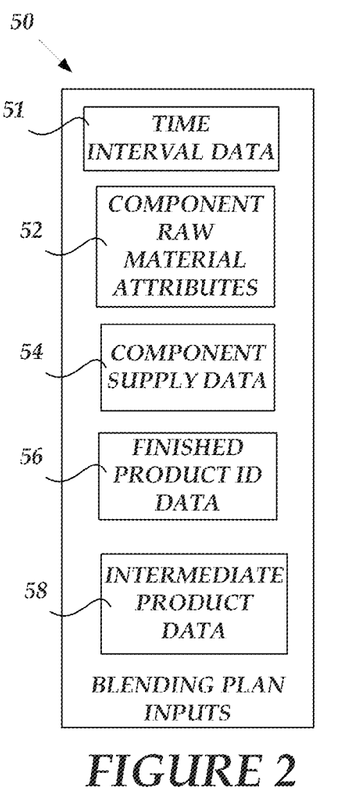
FIG. 2 is a block diagram illustrating various blending plan inputs utilized in optimizing a blending plan for concentrated consumable products, in accordance with various embodiments.

FIG. 2 is a block diagram illustrating various inputs in the blending plan inputs 50 which may be utilized in optimizing a blending plan for concentrated consumable products, in accordance with various embodiments. The blending plan inputs 50 may include time interval data 51, component raw material attributes 52, component supply data 54, finished product ID data 56 and intermediate product data 58.

The time interval data 51 may include a blending plan time interval for a concentrated consumable product. In accordance with an embodiment, the blending plan time interval may comprise a rolling monthly blend plan associated with the blending of various components utilized in the production of a concentrated consumable product such as a fruit juice. It should be understood however, that the blending plan time interval in the time interval data 51 is user-configurable and thus not limited to solely monthly blend plans. Thus, it may be envisioned that other time intervals (e.g., weekly, annually, etc.) may also be selected in accordance with the various embodiments described herein.

The component raw material attributes 52 may include various attribute specifications for a concentrated consumable product. For example, the attribute specifications for a concentrated juice product may include, without limitation, Brix (i.e., the sugar content of an aqueous solution), citric acid, Brix acid ratio, Vitamin C, color score, viscosity, limonin, flavor and varietal (e.g., the varieties of a fruit making up a finished concentrated juice product). It should be appreciated by those skilled in the art that other attribute specifications corresponding to the production of different types of concentrated consumable products (e.g., liquid food products) may also be utilized without departing from the spirit and scope of the various embodiments described herein.

The component supply data 54 may include one or more suppliers which are contracted to supply the various components utilized in blending a concentrated consumable product over the blending plan time interval. For example, the components (e.g., fruit) utilized in blending a concentrated fruit (e.g., orange) juice may consist of a projected number of gallons per month for each of multiple fruit juices provided by various suppliers located in different geographical locations.

The finished product ID data 56 may include the identification of one or more concentrated consumable products generated from the blending of various components. For example, finished product ID data for a blended concentrated fruit juice may include a frozen concentrate orange juice product, a chilled orange juice product, or a restaurant-branded orange juice product (among others).

The intermediate product data 58 may include a listing of various intermediate products (e.g., a pre-blended concentrate) which may be blended with other components in the production of a concentrated consumable product. For example, an intermediate product (e.g., a base) for a fruit juice may consist of chilled orange juice.

It should be understood that the blending plan inputs 50 may be utilized in a number of production scenarios in the blending of a concentrated consumable product. In particular, a concentrated consumable product may be made from various combinations (and various amounts) of intermediate products and other components to achieve a desired product. For example, in accordance with an illustrative production scenario, a concentrated fruit juice product may be made from one intermediate product, one or more blended juice components and one or more (pure) juice components.

Figure 3:
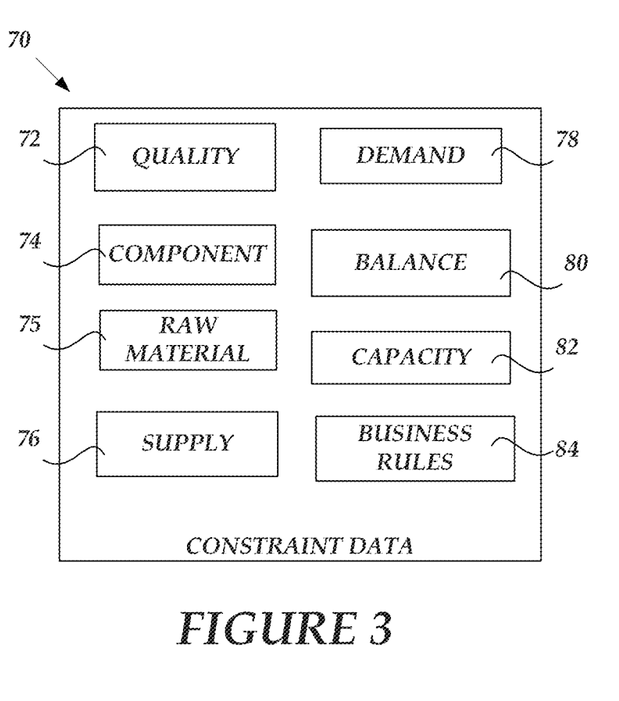
FIG. 3 is a block diagram illustrating constraint data utilized in optimizing a blending plan for concentrated consumable products, in accordance with various embodiments.

FIG. 3 is a block diagram illustrating constraint data 70 utilized in optimizing a blending plan for concentrated consumable products, in accordance with various embodiments. The constraint data 70 may include a quality constraint 72, a component constraint 74, a raw material constraint 75, a supply constraint 76, a demand constraint 78, a balance constraint 80, a capacity constraint 82 and a business rules constraint 84.

The quality constraint 72 may include upper and lower quality bounds (i.e., a quality range) for a concentrated consumable product in order to enforce finished product and component quality over a blending plan time interval. In accordance with an embodiment, the quality bounds may be applied to various input component raw material attributes (including intermediate product raw material attributes) for a concentrated consumable product. For example, quality bounds may be enforced for the following raw material attributes for a concentrated fruit juice and/or concentrated fruit juice base component: acid-Brix ratio (upper and lower bounds), color (upper and lower bounds), Vitamin C (lower bound), flavor (lower bound), limonin (upper and lower bounds) and viscosity (upper and lower bounds).

The component constraint 74 may include upper and lower component bounds (i.e., a range) for a concentrated consumable product in order to enforce the quantity of various components (including intermediate products) utilized in blending over a blending plan time interval. For example, upper and lower component bounds may be enforced for various fruit juices and fruit juice bases (i.e., pre-blended concentrates) utilized in the blending of a concentrated fruit juice.

The raw material constraint 75 may include minimum and maximum requirements associated with one or more categories of raw materials utilized in blending a concentrated consumable product.

The supply constraint 76 may include minimum and maximum end supply requirements (for each of one or more suppliers) for the storage components which are utilized in the production of a concentrated consumable product. The supply constraint 76 may also include minimum supply requirements (for each of one or more suppliers) for each component utilized in the blending of a concentrated consumable product. For example, the supply constraint 76 may define minimum supply requirements for each of a number of different types of orange juice utilized in the production of a concentrated orange juice.

The demand constraint 78 may include various component requirements (for each of one or more concentrated consumable products) including a requirement that the demand for components (including an intermediate product) used in a concentrated consumable product be greater than or equal to the demand for the product itself.

The balance constraint 80 may include a requirement for enforcing component conservation for components utilized in the production of a concentrated consumable product for each of one or more suppliers over a blending plan time interval. For example, a component conservation requirement may provide that the components used in a concentrated consumable product plus the components sent to storage must equal a current component supply plus a stored component supply for the last blending plan time interval.

The capacity constraint 82 may include a requirement for enforcing capacity limitations on various components utilized in the blending of a concentrated consumable product. Example capacity limitations may include making sure that a component used for a blended concentrated consumable product is less than or equal to a blender capacity, blender component bounds (e.g., the number of different components used in the blending of a concentrated consumable product is less than or equal to a blender component bound), a product component bound (e.g., the number of intermediate products, blended components and unblended components used for a concentrated consumable product is less than or equal to a product component bound), an intermediate product bound and a supplier limitation (e.g., a component sent from a supplier to a storage tank multiplied by a load-out factor is less than or equal to a load-out capacity).

The business rules constraint 84 may include various requirements including, but not limited to: limiting an amount of low quality components utilized in the blending of concentrated consumable products, utilizing only specified components (e.g., specific types of orange juices) in the blending of a concentrated consumable product, defining whether or not blended components may be utilized for a concentrated consumable product, blending ratios for components utilized in a concentrated consumable product and grade requirements.

Exemplary Operating Environment

Figure 4:
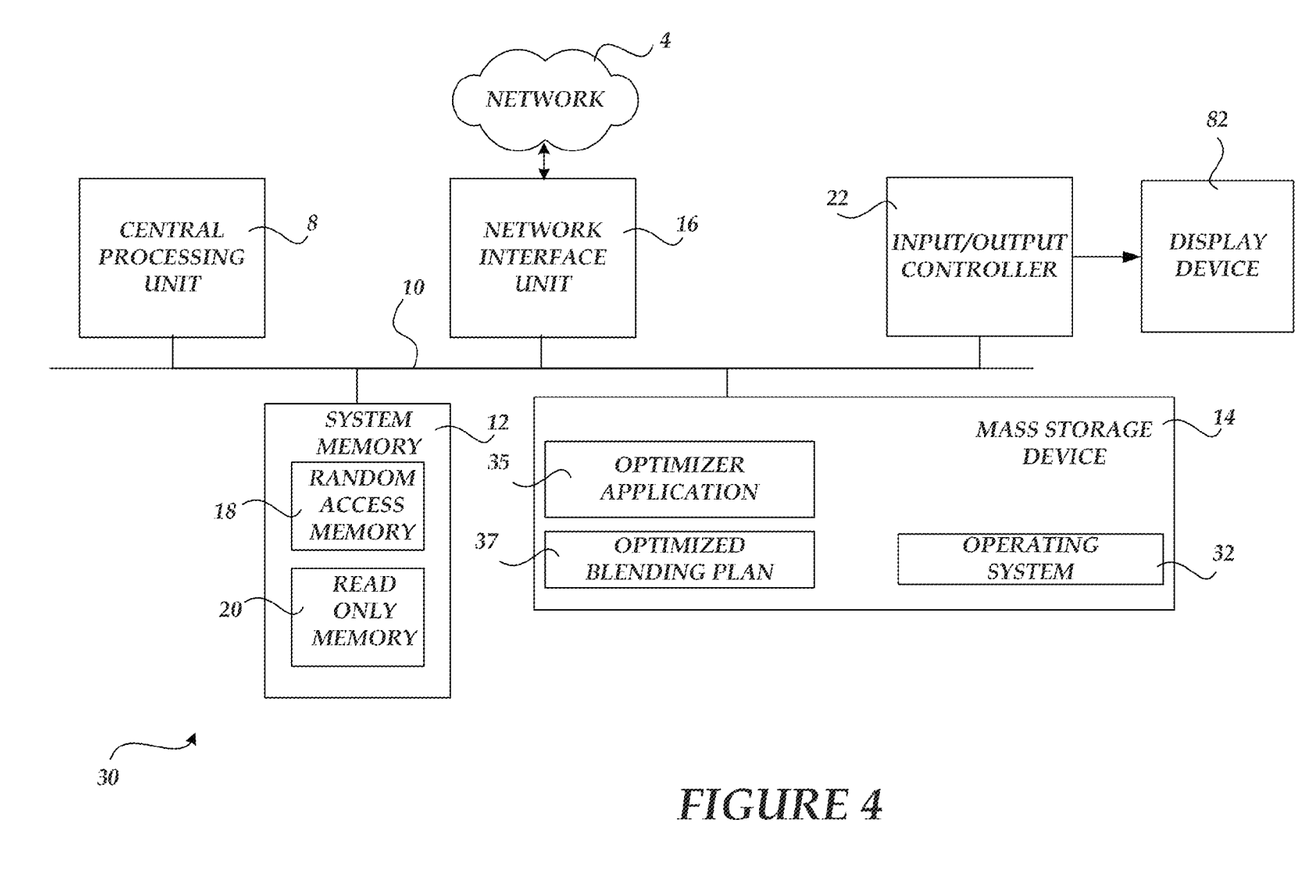
FIG. 4 is a block diagram illustrating a computing environment which may be utilized for optimizing a blending plan for concentrated consumable products, in accordance with various embodiments.

Referring now to FIG. 4, the following discussion is intended to provide a brief, general description of a suitable computing environment in which various illustrative embodiments may be implemented. While various embodiments will be described in the general context of program modules that execute in conjunction with program modules that run on an operating system on a computing device, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including handheld devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 4 shows the server 30 which may comprise a computing device which 2 includes at least one central processing unit 8 ("CPU"), a system memory 12 (including a random access memory 18 ("RAM") and a read-only memory ("ROM") 20) and a system bus 10 that couples the memory to the CPU 8. A basic input/output system containing the basic routines that help to transfer information between elements within the computer, such as during startup, is stored in the ROM 20. The server 30 further includes a mass storage device 14 for storing an operating system 32, the optimizer application 35 and an optimized blending plan 37, which is generated by the optimizer application 35.

In accordance with various embodiments, the operating system 32 may be suitable for controlling the operation of a networked computer. The mass storage device 14 is connected to the CPU 8 through a mass storage controller (not shown) connected to the bus 10. The mass storage device 14 and its associated computer-readable media provide non-volatile storage for the computing device 2. The term computer-readable media as used herein may include computer storage media. Computer storage media may include volatile and nonvolatile, removable and non-removable media implemented in any method or technology for storage of information, such as computer readable instructions, data structures, program modules, or other data. Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 2. Any such computer storage media may be part of the computing device 2.

The term computer-readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

According to various embodiments, the server 30 may operate in a networked environment using logical connections to remote computers through a network 4 which may include a local network or a wide area network (e.g., the Internet). The server 30 may connect to the network 4 through a network interface unit 16 connected to the bus 10. It should be appreciated that the network interface unit 16 may also be utilized to connect to other types of networks and remote computing systems. The server 30 may also include the input/output controller 22 for receiving and processing input from a number of input types, including, but not limited to, a keyboard, mouse, pen, stylus, finger, and/or other means (not shown). Similarly, an input/output controller 22 may provide output to a display device 82 as well as a printer, or other type of output device (not shown).

Figure 5:
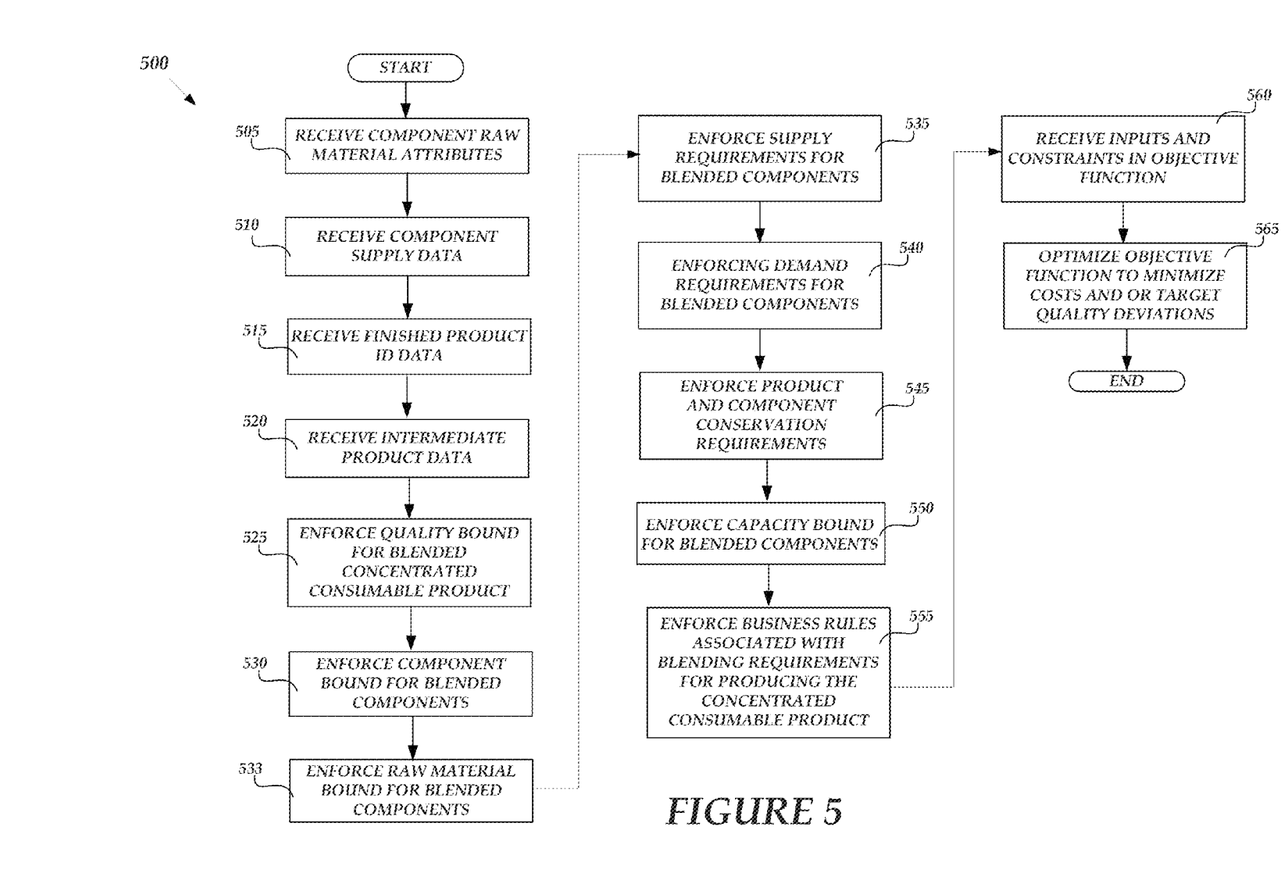
FIG. 5 is a flow diagram illustrating a routine for optimizing a blending plan for concentrated consumable products, in accordance with various embodiments.

FIG. 5 is a flow diagram 500 illustrating a routine for optimizing a blending plan for concentrated consumable products, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 500 begins at operation 505, where the optimizer application 35, executing on the application server 30, receives component raw material attributes utilized in producing a concentrated consumable product over a predetermined interval of time (e.g., a rolling monthly time interval). In particular, the optimizer application 35 may retrieve the component raw material attributes 50 from the blending plan inputs 50 stored on the database server 40.

From operation 505, the routine 500 continues to operation 510, where the optimizer application 35 executing on the application server 30 may receive component supply data (which may include quantities of various components provided by one or more suppliers) which are utilized in the blending of the concentrated consumable product. In particular, the optimizer application 35 may retrieve the component supply data 54 from the blending plan inputs 50 stored on the database server 40.

From operation 510, the routine 500 continues to operation 515, where the optimizer application 35 executing on the application server 30 may receive finished product ID data which identifies the concentrated consumable product produced from the blending of various components. In particular, the optimizer application 35 may retrieve the finished product ID data 56 from the blending plan inputs 50 stored on the database server 40.

From operation 515, the routine 500 continues to operation 520, where the optimizer application 35 executing on the application server 30 may receive intermediate product data which may be utilized in combination with one or more blended components in the blending of the concentrated consumable product. In particular, the optimizer application 35 may retrieve the intermediate product data 58 from the blending plan inputs 50 stored on the database server 40.

From operation 520, the routine 500 continues to operation 525, where the optimizer application 35 executing on the application server 30 may enforce a quality bound associated with product quality for the blended concentrated consumable product. In particular, the optimizer application 35 may apply the quality constraint 72 from the constraint data 70 stored on the database server 60 to the blending input data 50 to enforce the quality bound.

From operation 525, the routine 500 continues to operation 530, where the optimizer application 35 executing on the application server 30 may enforce a component bound associated with the blending of various components comprising the concentrated consumable product. In particular, the optimizer application 35 may apply the component constraint 74 from the constraint data 70 stored on the database server 60 to the blending input data 50 to enforce the component bound.

From operation 530, the routine 500 continues to operation 533, where the optimizer application 35 executing on the application server 30 may enforce a raw material bound which is associated with one or more categories of raw materials utilized in blending the concentrated consumable product. In particular, the optimizer application 35 may apply the raw material constraint 75 from the constraint data 70 stored on the database server 60 to the blending input data 50 to enforce the raw material bound.

From operation 533, the routine 500 continues to operation 535, where the optimizer application 35 executing on the application server 30 may enforce supply requirements for components utilized in blending the concentrated consumable product. In particular, the optimizer application 35 may apply the supply constraint 76 from the constraint data 70 stored on the database server 60 to the blending input data 50 to enforce the supply requirements.

From operation 535, the routine 500 continues to operation 540, where the optimizer application 35 executing on the application server 30 may enforce demand requirements for components utilized in blending the concentrated consumable product. In particular, the optimizer application 35 may apply the demand constraint 78 from the constraint data 70 stored on the database server 60 to the blending input data 50 to enforce the component demand requirement.

From operation 540, the routine 500 continues to operation 545, where the optimizer application 35 executing on the application server 30 may enforce product and component conservation requirements. In particular, the product and component conservation requirements may be utilized to balance produced and stored quantities of the concentrated consumable product with a supply of components (utilized in blending the concentrated consumable product) stored over at least a present and a previous interval of time. The optimizer application 35 may apply the balance constraint 80 stored on the database server 60 to the blending input data 50 to enforce the product and component conservation requirements.

From operation 545, the routine 500 continues to operation 550, where the optimizer application 35 executing on the application server 30 may enforce a capacity bound associated with capacity limitations of blenders and suppliers with respect to various components utilized in blending the concentrated consumable product. In particular, the optimizer application 35 may apply the capacity constraint 80 from the constraint data 70 stored on the database server 60 to the blending input data 50 to enforce the capacity bound.

From operation 550, the routine 500 continues to operation 555, where the optimizer application 35 executing on the application server 30 may enforce one or more business rules associated with blending requirements for producing the concentrated consumable product. In particular, the optimizer application 35 may apply the business rules constraint 84 from the constraint data 70 stored on the database server 60 to the blending input data 50 to enforce the business rules.

From operation 555, the routine 500 continues to operation 560, where the optimizer application 35 executing on the application server 30 may call an objective function for receiving the blending plan inputs 50 (discussed above with respect to operations 505-520) and the constraint data 70 (discussed above with respect to operations 525-555).

From operation 560, the routine 500 continues to operation 565, where the optimizer application 35 executing on the application server 30 may optimize the objective function to minimize costs associated with the production of the concentrated consumable product or alternatively, to minimize deviations from a target quality associated with the production of the concentrated consumable product. From operation 565, the routine 500 then ends.

As briefly discussed above, the optimizer application 35 may utilize an objective function (i.e., a mathematical model formulation) to generate an optimized blending plan which minimizes costs and violation of business rules or, alternatively, minimizes deviation quality targets and violation of business rules, associated with the production of a concentrated consumable product. For example, in accordance with an embodiment, objection function may be utilized to minimize the following costs: solid material costs (i.e., per unit costs for raw materials from a supplier at a time interval), processing fees (i.e., per unit processing fees for raw materials from a supplier at a time interval), blending costs (i.e., per unit blending costs at a blender from another supplier), own blending costs (i.e., per unit blending costs at a blender from the blender's own supplier), base costs (i.e., per unit intermediate product manufacturing costs at a blender from another supplier), own base costs (i.e., per unit intermediate product manufacturing costs at a blender from the blender's own supplier) and transportation costs (i.e., per unit transportation costs from a supplier to a blender). It should be understood that an infeasibility penalty may be also be applied to the objective function to insure the feasibility of achieving the objectives associated with an optimized blending plan. As defined herein, a "penalty" is a mathematical device (which may encompass any number of variables) for optimizing a blending plan. In accordance with an embodiment, a feasible blending plan is one in which one or more possible solutions to the objection function obeys the applied constraints. As another example, the objective function may be utilized to optimize concentrated consumable product quality by minimizing deviations from target attributes (e.g., flavor) for a concentrated consumable product over a time interval. It should be understood that the objective function may minimize primary and secondary positive and negative deviations for an attribute.

Figure 6:
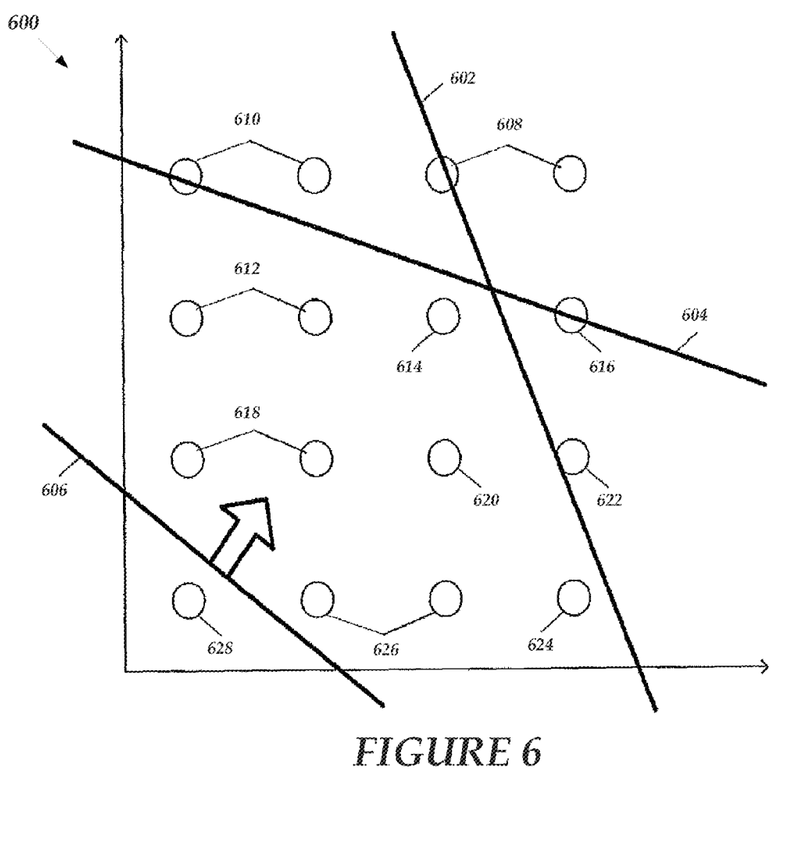
FIG. 6 is a graphical representation of an objective function and constraints utilized by a model formulation to optimize a blending plan for concentrated consumable products, in accordance with an embodiment.

FIG. 6 is a graphical representation 600 of an objective function and constraints utilized by a model formulation to optimize a blending plan for concentrated consumable products, in accordance with an embodiment. In the graphical representation 600, lines 602, 604 and 606 comprise constraints (e.g. requirements) and circles 608, 610, 612, 614, 616, 618, 620, 622, 624, 626 and 628 comprise possible solutions to the objective function in the above-described model formulation. In the model formulation, the objective function is maximized by finding a solution (i.e., a circle) that is inside of all of the constraints 602, 604 and 606 (i.e., a solution which obeys each of the constraints). Circles that are within the constraints 602, 604 and 606 are feasible solutions while circles outside of the constraints 602, 604 and 606 are infeasible. Thus, it may be seen with respect to the blending plan 600 that the circle (i.e., solution) 614 is optimal since it lies within each of the constraints 602, 604 and 606 and is the point that maximizes the objective function. Those skilled in the art should appreciate that the use of the penalties, discussed, is also referred to as multi-criteria optimization. It should further be appreciated that aforementioned penalties may be user-configurable values which may be determined via experimentation by a decision-maker involved in creating a concentrated consumable product blending plan.

The notation and equations for an illustrative optimization model formulation which optimizes a blending plan for a concentrated consumable product is shown below.

Notation:
Indices

| | |
|---|---|
| m: | time interval (month) |
| s: | supplier ID |
| j: | raw material ID (a batch of juice with specific attributes and varietal composition) |
| v: | raw material category ID; e.g. Early-Mid, Valencia, Brazilian, Costa Rican |
| q: | attribute type, e.g. Brix, Ratio, Vitamin C, Color, Flavor, Limonin, Viscosity |
| c: | raw material contract type; e.g. To be Purchased, Contracted |
| f: | facility ID |
| p: | product ID |
| b: | intermediate product; e.g. Base, From Ingredients |

Sets

| | |
|---|---|
| M: | set of periods |
| S: | inventory nodes |
| D: | blender nodes |
| F: | facility nodes |
| B: | set of intermediate products |
| P: | set of products |
| FJ: | set of raw materials associated with business rules |
| RJ: | set of raw materials associated with business rules |
| PV: | set of possible product and raw material category combinations |
| VQ: | set of possible raw material category and attribute combinations |
| SVJQs: | set of possible suppliers and raw material combinations |
| SVJQsmC: | set of possible supplier and contracts |
| SD: | set of possible supplier and blender links |
| DBP: | set of possible blender and intermediate product links |
| DP: | set of possible blender and product links |

Parameters

| | |
|---|---|
| NM: | number of time intervals (periods) |

Raw Material Attributes, Product Quality and Product Component Boun

| | |
|---|---|
| Qualityqj[$<q,j>\in$ QJ]: | Value of attribute q for raw material j |
| VMin$_{vpm}$[$<v,p,m>\in$ VPM]: | Minimum percentage of raw material category v in time interval m for finished product p |
| VMax$_{vpm}$[$<v,p,m>\in$ VPM]:: | Percentage of raw material category v in time interval m for finished product p |

| | -continued |
|---|---|
| QMin$_{qpm}$[<q,p,m>∈ QPM]: | Minimum value for attribute q in time interval m for finished product p |
| QMax$_{qpm}$[<q,p,m>∈ QPM]: | Minimum value for attribute q in time interval m for finished product p |
| BMinpm[<p,m>∈ PM]: | Minimum percentage of intermediate product in time interval m for finished product p |
| BMaxpm[<p,m>∈ PM]: | Maximum percentage of intermediate product in time interval m for finished product p |
| QTarget[q∈Q,p∈P,m∈M]: | Target value for attribute q for product p in time interval m |

Costs

| | |
|---|---|
| SolidCost$_{sjcm}$[<s,j,c,m>∈ SJCM]: | Per unit cost for raw material j from supplier s at time interval m |
| ProcessingFee$_{sjcm}$ [<s,j,c,m>∈ SJCM]: | Per unit processing fee for raw material j from supplier s at time interval m |
| BlendingCost$_d$[d ∈ D]: | Per unit blending cost at blender d from other supplier |
| OwnBlendingCost$_d$[d ∈ D]: | Per unit blending cost at blender d from own supplier |
| BaseCost$_d$[d ∈ D]: | Per unit intermediate product manufacturing cost at blender d from other supplier |
| OwnBaseCost$_d$[d ∈ D]: | Per unit intermediate product manufacturing cost at blender d from own supplier |
| TransportationCost$_{sd}$[<s,d> ∈ SD]: | Per unit transportation cost from supplier s to blender d |

Supply Chain Capacity and Business Rules

| | |
|---|---|
| LoadOut$_p$[p∈ P]: | Capacity factor of product p |
| FLoadOutfm[<f,m>∈ FM]: | Capacity from facility f at time interval m |
| S$_{sjcm}$[<s,j,c,m>∈ SJCM]: | Available raw material from supplier s at time interval w |
| MinReq$_s$ [s ∈ S]: | Minimum required raw material amount to be sourced from supplier s |
| MinReq$_{sv}$ [s ∈ S, v ∈V]: | Minimum required raw material amount to be sourced from supplier s of category v |
| BlendComp$_d$[d ∈ D]: | Maximum number of components that can be blended at blender d |
| BlenderCap$_d$[d ∈ D]: | Maximum blending capacity at blender d |
| EndSupplyMinReq$_{svjqsn}$ [(s,v,j,q,sn) SVJQs]: | Minimum ending inventory for supplier s raw material j |
| EndSupplyMaxReq$_{svjqsn}$ [(s,v,j,q,sn) ∈ SVJQs]: | Maximum ending inventory for supplier s raw material j |

Demand and Business Rules

| | |
|---|---|
| Demand$_{pm}$[p ∈ P, m ∈ M ]: | Demand forecast for plant p at time interval m |
| BaseDemand$_{pm}$[b ∈ B, m ∈ M ]: | Demand of intermediate product b at time interval m |
| ProductComp$_p$[p ∈ P]: | Maximum number of components that can be blended for product p |
| BaseComp$_b$[b ∈ B]: | Maximum number of components that can be blended for intermediate product b |
| ProdPenalty: | Penalty cost for infeasibility |

Decision Variables

| | |
|---|---|
| Xsp[<s,v,j,q,sn,m,c> ∈ SVJQsmC, p ∈ P ]: | Supplier to product flow = amount of raw material j from supplier s to product p in time interval m |
| Xsdbp[<s,v,j,q,sn,m,c>∈ SVJQsmC, <d,b,p>∈ DBP]: | Supplier to facility-intermediate product-product flow = amount of raw material j from supplier s to facility d to intermediate product b then to product p in time interval m |
| Xsdp[<s,v,j,q,sn,m,c> ∈ SVJQsmC, <d,p> ∈ DP]: | Supplier to facility-product flow = amount of raw material j from supplier s to intermediate product b then to product p in time interval m |
| Xs[<s,v,j,q,sn,m,c>∈ SVJQsmC]: | Carried inventory flow = amount of carried raw material j at supplier s from time interval m − 1 to m |
| QDevPPrimary[q∈Q,p∈P,m∈M]: | Primary positive deviation from target for attribute q, for product p, in period m |
| QDevNPrimary[q∈Q,p∈P,m∈M]: | Primary negative deviation from target for attribute q, for product p, in period m |
| QDevPSecondary[q∈Q,p∈P,m∈M]: | Secondary positive deviation from target for attribute q, for product p, in period m |
| QDevNSecondary[q∈Q,p∈P,m∈M]: | Secondary negative deviation from target for attribute q, for product p, in period m |

Objective Function
Minimize Cost $$\text{Min} \sum_{s,v,j,q,sn,m,c,p} Xsp * (ProcessingFee_{sjcm} + SolidCost_{sjcm}) +$$

$$\sum_{s,v,j,q,sn,m,c,d,b,p} Xsdbp * (ProcessingFee_{sjcm} + SolidCost_{sjcm}) +$$

$$\sum_{s,v,j,q,sn,m,c,d,p} Xsdp * (ProcessingFee_{sjcm} + SolidCost_{sjcm}) +$$

$$\sum_{s,v,j,q,sn,m,c,d} (Xsdbp + Xsdp) * TransportationCost_{sd} +$$

$$\sum_{\substack{s,v,j,q,sn,m,c,d,p \\ S.d = D.d}} Xsdp * OwnBlendingCost_d +$$

$$\sum_{\substack{s,v,j,q,sn,m,c,d,p \\ S.d \ne D.d}} Xsdp * BlendingCost_d + \sum_{\substack{s,v,j,q,sn,m,c,d,p \\ S.b = D.b}} Xsdbp +$$

$$OwnBaseCost_d + \sum_{\substack{s,v,j,q,sn,m,c,d,p \\ S.b \ne D.b}} Xsdbp + BaseCost_d +$$

$$\left( \sum_{s,v,j,q,sn,m,c,p} Xsp + \sum_{s,v,j,q,sn,m,c,d,b,p} Xsdbp + \sum_{s,v,j,q,sn,m,c,d,p} Xsdp - \sum_{p,m} Demand_{pm} \right) * ProdPenalty +$$

Minimize Deviation from Targets $$\text{Min} \sum_{q,p,m} (QDevPPrimary_{q,p,m} + QDevPSecondary_{q,p,m} + QDevNPrimary_{q,p,m} + QDevNSecondary_{q,p,m}) / QTarget_{q,p,m}$$

Constraints
Quality and Constraints
Product Quality Bounds Constraints $$\left( \sum_s Xsp * Qualityqj_{svjqsn} + \right.$$

-continued $$\sum_{s,d,b} Xsdbp * Qualityqj_{svjqsn} + \sum_{s,d} Xsdp * Qualityqj_{svjqsn}\right) \geq$$

$$QMin_p\left(\sum_s Xsp + \sum_{s,d,b} Xsdbp \sum_{s,d} Xsdp\right);$$

$$\forall p, m, q$$

$$\left(\sum_s Xsp * Qualityqj_{svjqsn} + \sum_{s,d,b} Xsdbp * Qualityqj_{svjqsn} + \sum_{s,d} Xsdp * Qualityqj_{svjqsn}\right) \leq$$

$$QMax_p\left(\sum_s Xsp + \sum_{s,d,b} Xsdbp + \sum_{s,d} Xsdp\right);$$

$$\forall p, m, q$$

Target Quality Constraints (for Quality Optimization Only)

$$\frac{\left(\sum_s Xsp * Qualityqj_{svjqsn} + \sum_{s,d,b} Xsdbp * Qualityqj_{svjqsn} + \sum_{s,d} Xsdp * Qualityqj_{svjqsn}\right)}{Demand_{p,m}} +$$

$$QDevPPrimary_{q,p,m} - QDevNPrimary_{q,p,m} +$$
$$QDevPSecondary_{q,p,m} - QDevNSecondary_{q,p,m} = QTarget_{q,p,m};$$

$$\forall p, m, q$$

$$QDevPPrimary_{q,p,m} - QDevNPrimary_{q,p,m} \leq Primary\ Bound_{q,p,m}$$

Intermediate Product Quality Bounds Constraints $$\sum_{s,d,p} Xsdbp * Qualityqj_{svjqsn} \geq QMin_b * \sum_{s,d,p} Xsdbp;$$

$$\forall b, m, q$$

$$\sum_{s,d,p} Xsdbp * Qualityqj_{svjqsn} \leq QMax_b * \sum_{s,d,p} Xsdbp;$$

$$\forall b, m, q$$

Raw Material Category Bounds Constraints for Products $$\sum_s Xsp + \sum_{s,d,b} Xsdbp + \sum_{s,d} Xsdp \geq$$

$$VMin_{vpm}\left(\sum_s Xsp + \sum_{s,d,p} Xsdbp + \sum_{s,d} Xsdp\right);$$

$$\forall p, m, v \in V$$

$$\sum_s Xsp + \sum_{s,d,b} Xsdbp + \sum_{s,d} Xsdp \leq$$

$$VMax_{vpm}\left(\sum_s Xsp + \sum_{s,d,b} Xsdbp + \sum_{s,d} Xsdp\right);$$

$$\forall p, m, v \in V$$

Component Bounds Constraints for Intermediate Products $$\Sigma_{s,d,p} xsdpb \geq Bmin_{bm}(\Sigma_{d,p} Xsdbp); \forall b, m, v \in V$$

$$\Sigma_{s,d,p} xsdpb \leq Bmax_{bm}(\Sigma_{d,p} Xsdbp); \forall b, m, v \in V$$

Supply-Demand Constraints
End Supply Requirements Constraints $$\sum_{m=NM, c=C} Xs \geq EndSupplyMinReq_{s,v,j,q,sn};$$

$$\forall (s, v, j, q, sn) \in SVJQs$$

$$\sum_{m=NM, c=C} Xs \leq EndSupplyMaxReq_{s,v,j,q,sn};$$

$$\forall (s, v, j, q, sn) \in SVJQs$$

Minimum Supply Requirement Constraints $$\sum_{v,j,q,sn,m,c,p} Xsp + \sum_{v,j,q,sn,m,c,d,b,p} Xsdbp + \sum_{v,j,q,sn,m,c,d,p} Xsdp \geq MinReq_s;$$

$$\forall s$$

$$\sum_{v,j,q,sn,m,c,p} Xsp + \sum_{v,j,q,sn,m,c,d,b,p} Xsdbp + \sum_{v,j,q,sn,m,c,d,p} Xsdp \geq MinReq_s;$$

Demand Constraints $$\sum_{s,v,j,q,sn,c} Xsp + \sum_{s,v,j,q,sn,c,d,b} Xsdbp + \sum_{s,v,j,q,sn,c,d} Xsdp \geq Demand_{pm};$$

$$\forall p, m$$

$$\sum_{s,v,j,q,sn,m,c,p} Xsdbp = BaseDemand_{bm};$$

$$\forall b \neq B_1, m$$

Balance Constraints
Sourcing Constraints $$\sum_p Xsp + \sum_{d,b,p} Xsdbp + \sum_{d,p} Xsdp + Xs_m = Supply_{s,v,j,q,sn,m,c} + Xs_{m-1};$$

$$\forall s, v, j, q, sn, m, c$$

$$\sum_p Xsp + \sum_{d,b,p} Xsdbp + \sum_{d,p} Xsdp + Xs_m = Supply_{s,v,j,q,sn,m,c} + Xs_{m-1};$$

$$\forall s, v, j, q, sn, m, c$$

Capacity Constraints
Blender Capacity Constraints $$\sum_{s,v,j,q,sn,c,b,p} Xsdbp + \sum_{s,v,j,q,sn,c,p} Xsdp \leq BlenderCap_d; \forall d, m$$

Blender Component Constraints $$\sum_{(v,q) \in VQ} \left(\sum_{s,v,j,q,sn,m,c,d,p} Xsdp \geq 0.001\right) \leq BlendComp_d; \forall d, m$$

Product Component Constraints $$\sum_{\langle v,q\rangle\in VQ}\left(\begin{array}{c}\left(\sum_{s,v,j,q,sn,m,c,d}Xsdp\geq 0.001\right)+\left(\sum_{s,v,j,q,sn,m,c}Xsp\geq 0.001\right)+\\ \left(\sum_{s,d,b}Xsdbp\geq 0.001\right)\end{array}\right)\leq$$

$$ProdComp_p; \forall\ p$$

Intermediate Product Component Constraints

$$\sum_{\langle v,q\rangle\in VQ}\left(\sum_{s,v,j,q,sn,m,c,d,p}Xsdbp\geq 0.001\right)\leq BaseComp_b; \forall\ d$$

Load-Out Capacity Constraints (Supplier to Facility)

$$\sum_{s=v,j,q,sn,c,p}Xsp*LoadOut_p + \sum_{s=f,s\neq d,v,j,q,sn,c,d,b,p}Xsdbp*LoadOut_p +$$
$$\sum_{s=f,s\neq d,v,j,q,sn,c,p}Xsdp*LoadOut_p \leq FLoadOut_{fm}; \forall\ f, m$$

Business Rule Constraints
Storage Blender Flow Limitation Constraints (for Specific Raw Materials)

$$\sum_{\substack{s,v,j,q,sn,m,c,d,b,p,\\ \langle s,d\rangle\notin SD}}Xsdbp\leq 0$$

$$\sum_{\substack{s,v,j,q,sn,m,c,d,b,p,\\ \langle s,d\rangle\notin SD}}Xsdp\leq 0$$

Treatment Limitation Constraints (for Specific Raw Materials)

$$\sum_{\substack{s,j,sn,m,c,d,b=B_1,p,\\ q<Q_1\ or\ v\in\{V_1,V_2\}}}Xsdbp\leq 0$$

No Blending at Certain Blenders Constraints

$$\sum_{s,v,j,q,sn,m,c,d\in\{D_1,D_2\},p}Xsdp\leq 0$$

Raw Materials from Certain Suppliers Only for Certain Products Constraints

$$\sum_{s=S_1,v,j,q,sn,m,c,p\ not\ in\{P_1,P_2\}}Xsp + \sum_{s=S_1,v,j,q,sn,m,c,p\ not\ in\{P_1,P_2\}}Xsdp +$$
$$\sum_{s=S_1,v,j,q,sn,m,c,d,b,p\ not\ in\{P_1,P_2\}}Xsdbp\leq 0$$

Certain Products Only from Certain Suppliers Constraints

$$\sum_{s\neq S_1,v,j,q,sn,m,c,p=P_1}Xsp + \sum_{s\neq S_1,v,j,q,sn,m,c,d,p=P_1}Xsdp\leq 0$$

Exclude Certain Quality Raw Materials from Certain Products

$$\sum_{s,v,j\notin J\cup FJ,q_1\leq q\leq q_2,sn,m,c,p=P_1}Xsp + \sum_{s,v,j\notin J\cup FJ,q_1\leq q\leq q_2,sn,m,c,p=P_1}Xsdp\leq 0$$

No Blending in Certain Products Constraints

$$\sum_{s,v,j,q,sn,m,c,d,p=P_1}Xsdp\leq 0$$

Bulk Usage for Certain Quality Raw Materials Constraints

$$\sum_{s,v,j,q=q_1,sn,m,c,p}Xsp + \sum_{s,v,j,q=q_1,sn,m,c,d,p}Xsdp + \sum_{s,v,j,q=q_1,sn,m,c,d,b,p}Xsdbp \leq$$
$$0.1*\left(\begin{array}{c}\sum_{s,v,j,q=q_1,sn,m,c,p}Xsp + \sum_{s,v,j,q=q_1,sn,m,c,d,p}Xsdp +\\ \sum_{s,v,j,q=q_1,sn,m,c,d,b,p}Xsdbp\end{array}\right); \forall\ p\notin\{p_1,p_2\}$$

Certain Raw Material Categories not Together Constraints

$$\left(\begin{array}{c}\sum_{s,v=V_1,j,q,sn,m,c,p}Xsp + \sum_{s,v=V_1,j,q,sn,m,c,d,p}Xsdp +\\ \sum_{s,v=V_1,j,q,sn,m,c,d,b,p}Xsdbp\geq 0.001\end{array}\right)+$$

$$\left(\begin{array}{c}\sum_{s,v=V_2,j,q,sn,m,c,p}Xsp + \sum_{s,v=V_2,j,q,sn,m,c,d,p}Xsdp +\\ \sum_{s,v=V_2,j,q,sn,m,c,d,b,p}Xsdbp\geq 0.001\end{array}\right)\leq 1$$

Grade Constraints

$$\sum_{s,v,j\in FJ,q,sn,m,c,p}Xsp + \sum_{s,v,j\in FJ,q,sn,m,c,d,p}Xsdp + \sum_{s,v,j\in FJ,q,sn,m,c,d,b,p}Xsdbp \leq$$
$$0.4*\left(\sum_{s,v,j,q,sn,m,c,p}Xsp + \sum_{s,v,j,q,sn,m,c,d,p}Xsdp + \sum_{s,v,j,q,sn,m,c,d,b,p}Xsdbp\right)$$

$$\sum_{s,v,j\in RJ,q,sn,m,c,p}Xsp + \sum_{s,v,j\in RJ,q,sn,m,c,d,p}Xsdp + \sum_{s,v,j\in RJ,q,sn,m,c,d,b,p}Xsdbp \leq$$
$$0.1*\left(\sum_{s,v,j,q,sn,m,c,p}Xsp + \sum_{s,v,j,q,sn,m,c,d,p}Xsdp + \sum_{s,v,j,q,sn,m,c,d,b,p}Xsdbp\right);$$
$$\forall\ p\neq p_1, m$$

$$\sum_{s,v,j,q=q_1,sn,m,c,p}Xsp + \sum_{s,v,j,q=q_1,sn,m,c,d,p}Xsdp + \sum_{s,v,j,q=q_1,sn,m,c,d,b,p}Xsdbp \leq$$
$$0.1*\left(\sum_{s,v,j,q,sn,m,c,p}Xsp + \sum_{s,v,j,q,sn,m,c,d,p}Xsdp + \sum_{s,v,j,q,sn,m,c,d,b,p}Xsdbp\right);$$

-continued $$\sum_{s,v,j,q=q_1,sn,m,c,p} Xsp + \sum_{s,v,j,q=q_1,sn,m,c,d,p} Xsdp + \sum_{s,v,j,q=q_1,sn,m,c,d,b,p} Xsdbp \leq$$

$$0.25 * \left( \sum_{s,v,j,q,sn,m,c,p} Xsp + \sum_{s,v,j,q,sn,m,c,d,p} Xsdp + \sum_{s,v,j,q,sn,m,c,d,b,p} Xsdbp \right);$$

$$\forall p \notin \{p_1, p_2\}, m$$

$$\forall p = p_1, m$$

Various embodiments are described above with reference to block diagrams and/or operational illustrations of methods, systems, and computer program products. The operations/acts noted in the blocks may be skipped or occur out of the order as shown in any flow diagram. For example, two or more blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routine's operations may be modified in any manner, including by reordering operations and/or inserting or operations, without departing from the embodiments described herein.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of optimizing a blending plan for concentrated consumable products, comprising:

receiving, by an application server, a plurality of input associated with a blending plan for the production of a concentrated consumable product over a predetermined interval of time, the plurality of inputs including a time interval data, one or more component raw material attributes for components utilized in producing the concentrated consumable product wherein the raw material attribute includes Brix, quantities of the components provided by one or more suppliers, data identifying the concentrated consumable product produced from blending the components and data identifying an intermediate product within the components utilized in producing the concentrated consumable product, wherein the intermediate product is utilized in combination with one or more other components in the blending of the concentrated consumable product, the intermediate product comprising a pre-blended concentrate;

applying, by the application server, a plurality of constraints to each of the plurality of inputs to optimize the blending plan over the predetermined period of time, the plurality of constraints comprising: a quality bound associated with enforcing quality for the concentrated consumable product, a raw material bound associated with one or more categories of raw materials utilized in blending the concentrated consumable product, a component bound associated with the blending of components comprising the concentrated consumable product, supply requirements for the components utilized in blending the concentrated consumable product, a component demand requirement for the components utilized in blending the concentrated consumable product, a component conservation requirement utilized in blending the concentrated consumable product, a capacity bound associated with capacity limitations of blenders and suppliers with respect to the components utilized in blending the concentrated consumable product and one or more business rules associated with blending requirements for producing the concentrated consumable product, wherein the component conservation requirement comprises balancing produced and stored quantities of the concentrated consumable product with a supply of the components, the components being stored over at least a present and a previous interval of time;

generating, by the application server, an optimized blending plan which optimizes an objective function comprising the plurality of inputs and the plurality of constraints to at least one of minimize those costs associated with the production of the concentrated consumable product and minimize deviations from a target quality associated with the production of the concentrated consumable product;

and blending components based on the optimized blending plan to produce a concentrated consumable product, wherein the concentrated consumable product is a concentrated fruit juice.

2. The method of claim 1, wherein receiving the plurality of inputs associated with the blending plan for the production of the concentrated consumable product over the predetermined interval of time comprises receiving the plurality of inputs associated with blending the concentrated consumable product over a rolling monthly time interval.

3. The method of claim 1, wherein receiving one or more inputs associated with the blending of a concentrated consumable product over a predetermined interval of time comprises receiving supply data comprising quantities of various components provided by one or more suppliers, the components being utilized in the blending of the concentrated consumable product.

4. The method of claim 1, wherein receiving one or more inputs associated with the blending of a concentrated consumable product over a predetermined interval of time comprises receiving data identifying the concentrated consumable product produced from blending various components.

5. The method of claim 1, wherein receiving one or more inputs associated with the blending of a concentrated consumable product over a predetermined interval of time comprises receiving data for an intermediate product, the intermediate product being utilized in combination with one or more blended components, in the blending of the concentrated consumable product.

6. The method of claim 1, wherein applying, by the computer, one or more constraints to each of the one or more inputs over the predetermined interval of time comprises enforcing a component bound associated with the blending of various components comprising the concentrated consumable product.

7. The method of claim 1, wherein applying, by the computer, one or more constraints to each of the one or more inputs over the predetermined interval of time comprises enforcing a raw material bound associated with one or more categories of raw materials utilized in blending the concentrated consumable product.

8. The method of claim 1, wherein applying, by the computer, one or more constraints to each of the one or more inputs over the predetermined interval of time, comprises enforcing supply requirements for components utilized in blending the concentrated consumable product.

9. The method of claim 1, wherein applying, by the computer, one or more constraints to each of the one or more inputs over the predetermined interval of time comprises enforcing a component demand requirement for components utilized in blending the concentrated consumable product.

10. The method of claim 1, wherein applying, by the computer, one or more constraints to each of the one or more inputs over the predetermined interval of time comprises enforcing a component conservation requirement by balancing produced and stored quantities of the concentrated consumable product with a supply of components, stored over at least a present and a previous interval of time, the supply of components being utilized in blending the concentrated consumable product.

11. The method of claim 1, wherein applying, by the computer, one or more constraints to each of the one or more inputs over the predetermined interval of time comprises enforcing a capacity bound associated with capacity limitations of blenders and suppliers with respect to various components utilized in blending the concentrated consumable product.

12. The method of claim 1, wherein applying, by the computer, one or more constraints to each of the one or more inputs over the predetermined interval of time comprises enforcing one or more business rules associated with blending requirements for producing the concentrated consumable product.

13. A computer system for optimizing a blending plan for concentrated consumable products, comprising:
a memory storing a non-transitory executable program code; and
a processor, functionally coupled to the memory, the processor being responsive to computer-executable instructions contained in the non-transitory executable program code and operative to:
receive a plurality of inputs associated with the blending plan for the concentrated consumable product over a rolling monthly time interval, wherein the plurality of inputs comprise: one or more raw material attributes for components utilized in producing the concentrated consumable product, wherein the raw material attribute includes Brix quantities of the components provided by one or more suppliers, data identifying the concentrated consumable product produced from blending the components and data identifying an intermediate product within the components utilized in producing the concentrated consumable product, wherein the intermediate product is utilized in combination with one or more other components in the blending of the concentrated consumable product, the intermediate product comprising a pre-blended concentrate;
apply, by the processor a plurality of constraints to each of the plurality of inputs to generate an optimized blending plan for the concentrated consumable product over the rolling monthly time interval, wherein the plurality of constraints comprise: a quality bound associated with enforcing quality for the concentrated consumable product, a raw material bound associated with one or more categories of raw materials utilized in blending the concentrated consumable product, a component bound associated with the blending of components comprising the concentrated consumable product, supply requirements for the components utilized in blending the concentrated consumable product, a component demand requirement for the components utilized in blending the concentrated consumable product, a component conservation requirement utilized in blending the concentrated consumable product, a capacity bound associated with capacity limitations of blenders and suppliers with respect to the components utilized in blending the concentrated consumable product and one or more business rules associated with blending requirements for producing the concentrated consumable product, wherein the component conservation requirement comprises balancing produced and stored quantities of the concentrated consumable product with a supply of the components, the components being stored over at least a present and a previous interval of time;
optimize an objective function comprising the plurality of inputs and the plurality of constraints to at least one of minimize those costs associated with the production of the concentrated consumable product and minimize deviations from a target quality associated with the production of the concentrated consumable product; and
cause the optimized blending plan to be used to produce the concentrated consumable product by mixing components in a blender, wherein the concentrated consumable product is a concentrated fruit juice.

14. A non-transitory computer-readable storage medium comprising computer executable instructions which, when executed on a computer, will cause the computer to perform a method of optimizing a blending plan for concentrated consumable products, the method comprising:
receiving a plurality of inputs associated with the blending plan for the concentrated consumable product over a predetermined interval of time, the plurality of inputs comprising: one or more raw material attributes for components utilized in producing the concentrated consumable product wherein the raw material attribute includes Brix, quantities of the components provided by one or more suppliers, data identifying the concentrated consumable product produced from blending the components and data identifying an intermediate product within the components utilized in producing the concentrated consumable product, wherein the intermediate product is utilized in combination with one or more other components in the blending of the concentrated consumable product, the intermediate product comprising a pre-blended concentrate;
applying a plurality of constraints to each of the plurality of inputs to optimize the blending plan over the predetermined period of time, the plurality of constraints comprising: a quality bound associated with enforcing quality for the concentrated consumable product, a raw material bound associated with one or more categories of raw materials utilized in blending the concentrated consumable product, a component bound associated with the blending of components comprising the concentrated consumable product, supply requirements for the components utilized in blending the concentrated consumable product, a component demand requirement for the components utilized in blending the concentrated consumable product, a component conservation requirement utilized in blending the concentrated consumable product, a capacity bound associated with capacity limitations of blenders and suppliers with respect to the components utilized in blending the concentrated consumable product and one or more business rules associated with blending requirements for producing the concentrated consumable product, wherein the component conservation requirement comprises balancing produced and stored quantities of the concentrated consumable product with a supply of the components, the components being stored over at least a present and a previous interval of time;

optimizing an objective function comprising the one or more inputs and the one or more constraints to at least one of minimize the costs associated with the production of the concentrated consumable product and minimize deviations from a target quality associated with the production of the concentrated consumable product; and causing the optimized blending plan to be used to produce the concentrated consumable product by mixing components in a blender, wherein the concentrated consumable product is a concentrated fruit juice.

15. The computer-readable storage medium of claim 14, wherein the pre-determined time interval comprises a rolling monthly time interval.

\* \* \* \* \*